(12) United States Patent
Papke

(10) Patent No.: US 6,712,957 B2
(45) Date of Patent: Mar. 30, 2004

(54) STATIONARY BILGE WATER FILTER APPARATUS

(76) Inventor: Rolf M. Papke, 332 Mantoloking Rd., Brick, NJ (US) 08723

( * ) Notice: Subject to any disclaimer, the term of this patent is extended or adjusted under 35 U.S.C. 154(b) by 47 days.

(21) Appl. No.: 10/216,639

(22) Filed: Aug. 12, 2002

(65) Prior Publication Data

US 2004/0026303 A1 Feb. 12, 2004

(51) Int. Cl.[7] .............................. C02F 1/40; E02B 15/04
(52) U.S. Cl. .................... 210/112; 210/242.4; 210/266; 210/299; 210/317; 210/416.1
(58) Field of Search .................... 210/97, 266, 924, 210/300, 301, 538, 170, 242.3, 242.4, 172, 299, 311, 317, 287, 288, 109, 112, 114, 416.1; 137/123–153

(56) References Cited

U.S. PATENT DOCUMENTS

| | | | | | |
|---|---|---|---|---|---|
| 1,038,417 A | * | 9/1912 | Mullennix | .................. | 210/311 |
| 1,861,481 A | * | 6/1932 | Rabjohn | .................... | 210/317 |
| 3,957,641 A | * | 5/1976 | Jakubek et al. | ............. | 210/120 |
| 4,120,793 A | * | 10/1978 | Strain | ........................ | 210/175 |
| 5,181,802 A | * | 1/1993 | Thengs et al. | ................ | 405/70 |
| 6,004,470 A | * | 12/1999 | Abril | .......................... | 210/776 |
| 6,398,966 B1 | * | 6/2002 | Smith et al. | ................. | 210/691 |
| 6,645,387 B2 | * | 11/2003 | Naski et al. | ................. | 210/744 |
| 6,652,750 B1 | * | 11/2003 | Pica et al. | | |

FOREIGN PATENT DOCUMENTS

| | | | | | |
|---|---|---|---|---|---|
| GB | 1508224 A | * | 4/1978 | ........... | B01D/17/04 |
| JP | 10128322 A | * | 5/1998 | ............. | C02F/1/40 |

* cited by examiner

*Primary Examiner*—Joseph Drodge
*Assistant Examiner*—Terry K. Cecil
(74) *Attorney, Agent, or Firm*—Charles I. Brodsky

(57) ABSTRACT

A casing having an inlet which receives oil-based contaminated bilge water is mounted on a boat or ship in aligning a generally U-configured pipe vertically, in which first and second open ends of the pipe are overlaid with one of a gravel or charcoal coarse material restrictive to the flow of oil-based contaminants, and with the second open pipe end coupled to the casing outlet, such that with a plurality of filter pads floating atop the overlying layer adapted to absorb oil-based contaminants, a continuous absorption of the contaminants occur as the bilge water circulates through the casing and is allowed to dwell therein while the filter pads absorb the oil-based contaminants floating atop the inputted bilge water.

16 Claims, 4 Drawing Sheets

STATIONARY BILGE WATER FILTER APPARATUS

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the removal of oil-based contaminants from bilge water being discharged from a boat or ship, in general, and to a new and improved bilge water filter apparatus which is both readily serviceable and highly effective, in particular.

2. Description of the Related Art

As is well known and understood, in inboard and inboard/outboard motorized vessels, a certain amount of oil as leaks from the engine, the transmissions and the various outdrives remains in the bilge area until such time as the operator of the vessel determines to purge the accumulation. Typically, the purging is done by using a motorized bilge pump system if available, or by the simple removal of a bilge plug.

As will be appreciated, when purging the accumulation, the operator is discharging mixtures of water and oil into lakes, lagoons, bays, rivers or oceans where the craft is sailing—and if done on dry land, the discharge flows into the soil and/or into the streets. Ultimately, the discharge can lead to extensive environmental destruction—or if done on dry land, to something as simple as an oil slick on the ground which can cause a motor vehicle accident. Additionally, the discharge can lead to wildlife impairing damage, as well as significant clean-up costs where an area of contamination rises above an accepted level of pollution.

As is also well known, extensive legislation has been enacted worldwide in recent years to maintain clean waters. As a part of a dramatically increased spending program, this legislation and its accompanying regulations have been strictly applied against boaters, boat dealers, and boating service centers who might otherwise discharge oil and other petroleum-based contaminants into the water. As will be appreciated by those skilled in the art, one particular concern involves the bilge water which is periodically discharged from the hulls of boats, and which typically includes gasoline, transmission and power steering fluid, cleaning solvent and paint accumulations.

Obviously, a filtration system that secures the safety of the environment, and provides a means of effectively cleaning these waste materials inexpensively and simply is highly desirable. One approach that has been proposed to accomplish this is that described in Application Ser. No. 09/680,181, now U.S. Pat. No. 6,652,750 entitled "Externally Mounted Bilge Water Filter and Methods Therefor", in describing the use of a disposable filter. Analysis and investigation, however, have shown that serviceable filters oftentimes are more effective than disposable filters in removing contaminants—and, over the long haul, are more economical to use in providing optimum results.

OBJECTS OF INVENTION

It is an object of the present invention, therefore, to provide an enhanced bilge water filter apparatus for oil-based contaminants.

It is object of the present invention, also, to provide such apparatus which offers a high degree of contaminant removal, at a relatively inexpensive cost.

It is another object of the invention to provide such apparatus which is easily serviceable in use.

It is a further object of the invention to provide such apparatus which allows adaptation in a variety of different manners.

SUMMARY OF THE INVENTION

As will become clear from the following description, the apparatus of the invention relies on the molecular weight difference between water and oil by which the oil always floats on top. As will also be seen, the operation relies on the availability of filter pads which allow water to pass through quite easily, but which absorb oil-based contaminants. Following the realization that the longer the "dwell time" is of the oil on the water while in contact with the filter pads, the greater the oil-based contaminant absorption will be, the apparatus of the invention incorporates this through the utilization of a generally U-configured pipe aligned vertically within an enclosed casing.

As with the externally mounted bilge water filter of Application Ser. No. 09/680,181 now U.S. Pat. No. 6,652,750, the stationary bilge water filter apparatus of the present invention is adapted to be externally coupled to the bilge water discharge outlet of the vessel by a snap-fit or friction-fit coupling, for example. As will become clear from the description that follows, the enclosed casing aligns the pipe in vertical orientation, with the oil-based contaminant bilge water being inputted into the casing by way of an included inlet. A first open end of the U-configured pipe is overlaid by a layer of material restrictive to the flow of any oil-based contaminant in the bilge water, while a second open end of the pipe (also overlaid by the layer) is coupled with an outlet of the casing. A plurality of the filter pads are added atop the overlying layer, adapted to absorb the oil-based contaminants in the bilge water. With the overlying layer including a coarse gravel or charcoal mixture, for instance, the oil-based contaminants in the inputted bilge water will be prevented from flowing to the first open end of the U-configured pipe. With the bilge water inputted above the overlying layer—at a side surface of the casing, for example—, the oil-based contaminants thus rise as the water level in the casing rises, to then be absorbed by the filter pads floating on the water's surface. As the water level continues to dwell in the casing, more-and-more of the oil-based contaminants thus become absorbed, to the extent that a removable lid provided in the top surface of the casing can then be removed by a user, to simply reach in and remove and replace the filter pads as they become filled. With the second open end of the U-configured pipe coupling to the outlet either downwardly below the overlying coarse material, or extending sideways to the outlet across it, the discharge becomes one of substantially contaminant-free water only. Testing has shown that well over 90% of the introduced oil-based contaminants can be removed in this manner, with the process being able to be speeded-up in time by the mere activation of the vessel's bilge pump to begin with.

In a preferred embodiment of the invention, the enclosed casing is selected to have a vertical axis of height dimension greater than an included horizontal axis of length dimension. Individual ones of the plurality of filter pads are vertically aligned in columns, horizontally spaced one from another— and to further enhance the absorption provided, the filter pads may be additionally spaced one from another in one or more rows. As the oil-based contaminated bilge water rises in the casing, more and more of the filter pads will be understood to come into play in absorbing the oil-based contaminants, while allowing the substantially contaminant free bilge water to pass. In this embodiment, the casing inlet is included within a side surface, while the casing outlet is included within a bottom surface. Such outlet then effectively serves as the discharge outlet of the boat.

Thus, the bilge water filter apparatus of the invention will be understood to include the casing, its inlet and outlet, the overlying coarse material layer, the U-configured pipe and the absorption filter pads. Because the petroleum products, are of lesser molecular weight than that of the water, the oil contamination floats on top; and as the casing fills with the contaminated bilge water, the filtration process continues to allow sufficient dwell time for the oils and water to separate, with the filter pads absorbing the oil molecules while permitting only contaminant-free water to pass and drain from the outlet. Any oils that might still remain, continue, however, to be prevented from escaping to the casing outlet by virtue of the gravel/charcoal mixture or similar coarse material layer.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1:
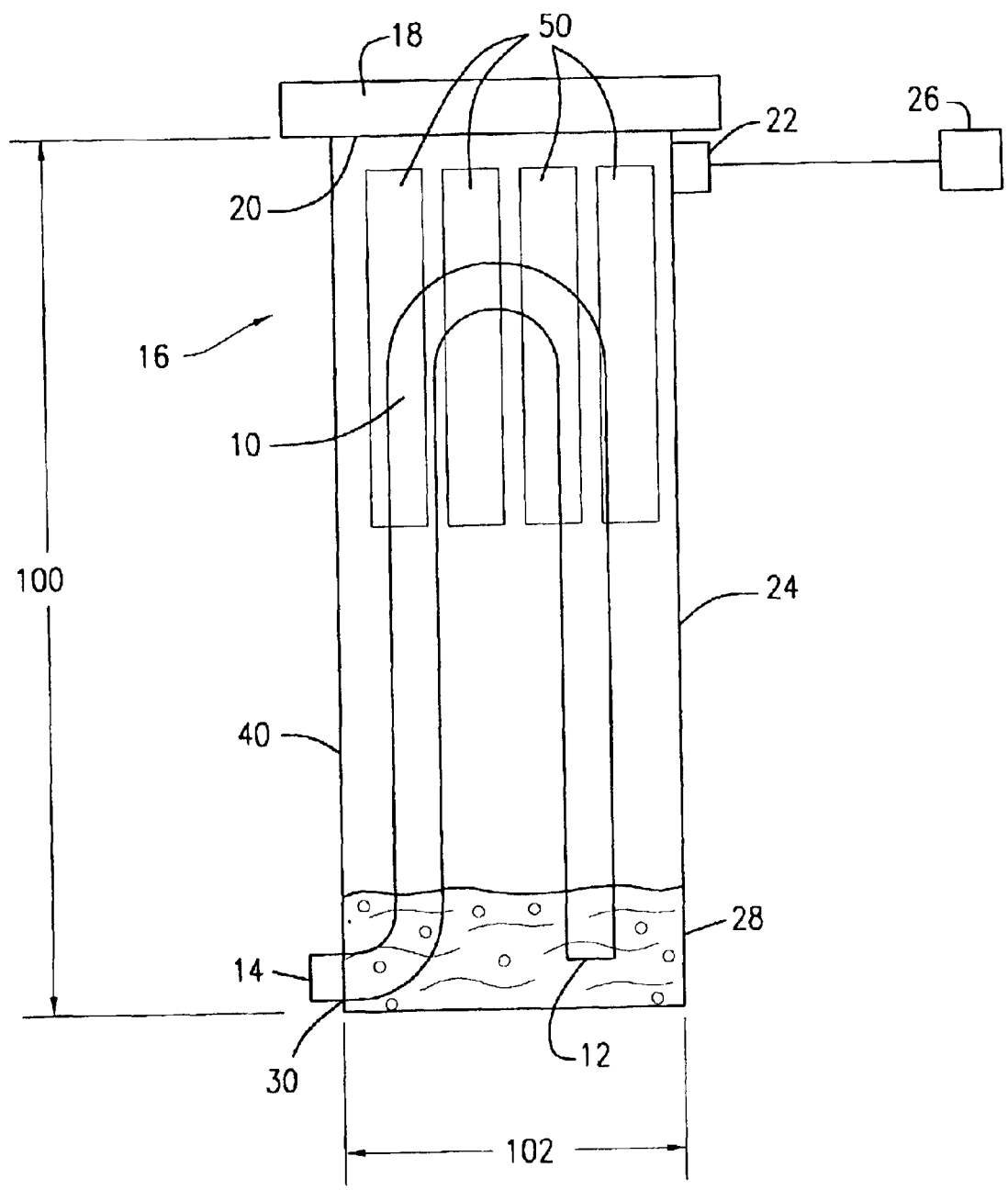
FIGS. 1–4 are cross-sectional views helpful in an understanding of the bilge water filter apparatus of the invention in several of its variants.

In FIGS. 1–4, the bilge water filter apparatus 40 includes a generally U-configured pipe 10 having first and second open ends 12, 14. An enclosed casing 16 having a removable lid 18 in its top surface 20 aligns the pipe 10 in a vertical orientation, as shown. An inlet 22, illustrated as being in a side surface 24 of the casing 16, may be coupled with the bilge water discharge outlet of a boat (shown at 26), and a layer of material 28 overlies the first open pipe end 12—being restrictive to the flow of oil-based contaminants, as, for example, when including either or both of a coarse gravel and charcoal mixture. An outlet 30 in FIG. 1—32 in FIG. 4—couples with the second open pipe end 14 in providing a discharge for the casing 16, with the end 14 also being overlaid by the material 28. A plurality of filter pads 50 initially seat atop the overlying layer 28, of a floatable nature to rise upwardly as oil-based contaminant bilge water is inputted into the casing 16 via the inlet 22 from the discharge outlet 26. Such filter pads, shown as being four in number in FIG. 1, are horizontally spaced one from another, and adapted to absorb oil-based contaminants while allowing substantially contaminant free water to pass therethrough. Such filter pads may be of a type manufactured by Environ Marine, under the Tradename BILGE BUOY, capable of absorbing one gallon and more of fuel and oil depending on size.

In operation, as the bilge pump is activated, the oil contaminated bilge water enters the casing 16 by way of the inlet 22, but its oil-based contaminants are prevented by the gravel and/or charcoal mixture from entering the open pipe end 12 or from reaching the outlet 30. The oil-based contaminated molecules ride atop the rising water level in the casing 16, only to be absorbed by the filter pads 50 which float with the water level. Such absorption takes place when the water level is "high" as illustrated in FIG. 1, as well as when the water level is "low", when the filter pads 50 float near to the overlying layer 28. The operation of the pump forces the substantially contaminant free water up through the open end 12 of the U-configured pipe 10, to exit the open end 14 at the outlet 30 as a substantially contaminant free water discharge; the oil-based contaminants are captured by the filter pads 50.

Figure 2:
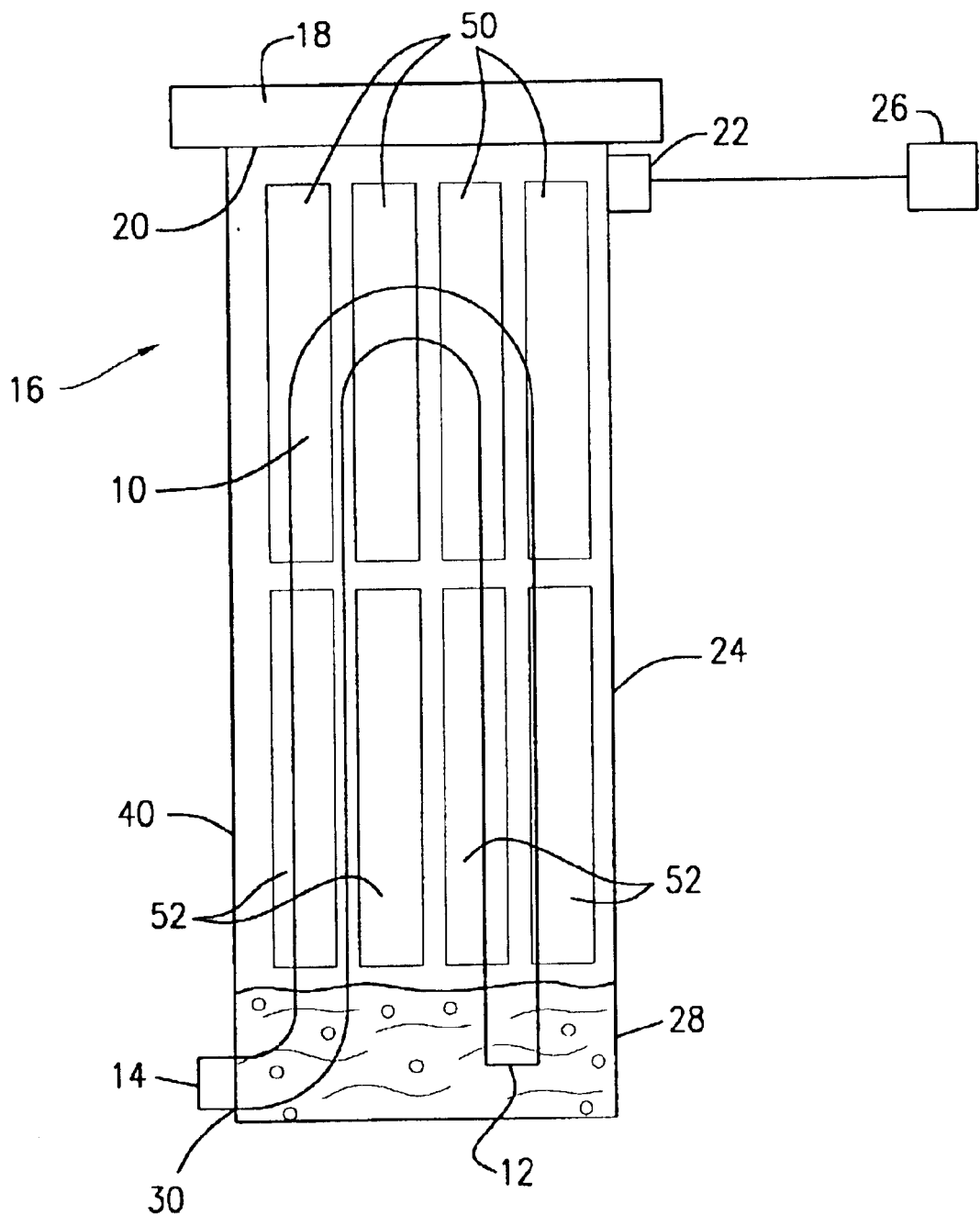

Whereas FIG. 1 illustrates one embodiment of a bilge water filter including four side-by-side filter pads 50, FIG. 2 shows a cross-section where a second row of four horizontally spaced filter pads 52 is added. As with the embodiment of FIG. 1, such additional pads can be removed and replaced for servicing over time simply by removing the lid 18 and reaching in to withdraw any and all of the pads, 50, 52.

Figure 3:
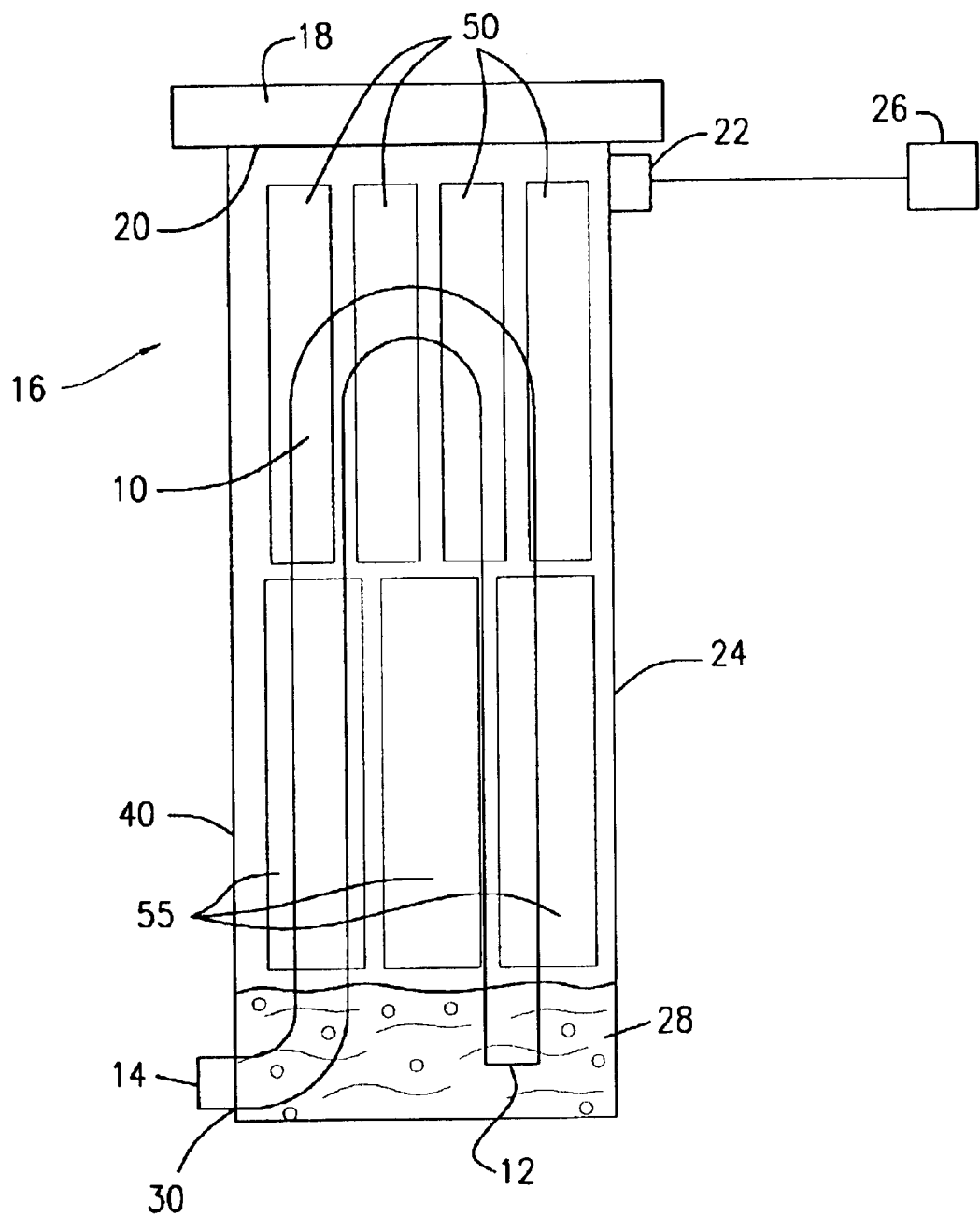

Whereas FIG. 2 shows the orientation of four horizontally spaced filter pads in each of two rows, the embodiment of FIG. 3 illustrates that the casing 16 may include different numbers of pads in each row, as with four pads 50 in the upper row, and three pads 55 in the lower row. As with the configurations of FIGS. 1 and 2, the filter pads ride upwardly and downwardly with the level of bilge water within the casing, absorbing the lighter molecule oil-based petroleum products for as long as they continue to float atop the water's surface, or even if submerged below it.

Figure 4:
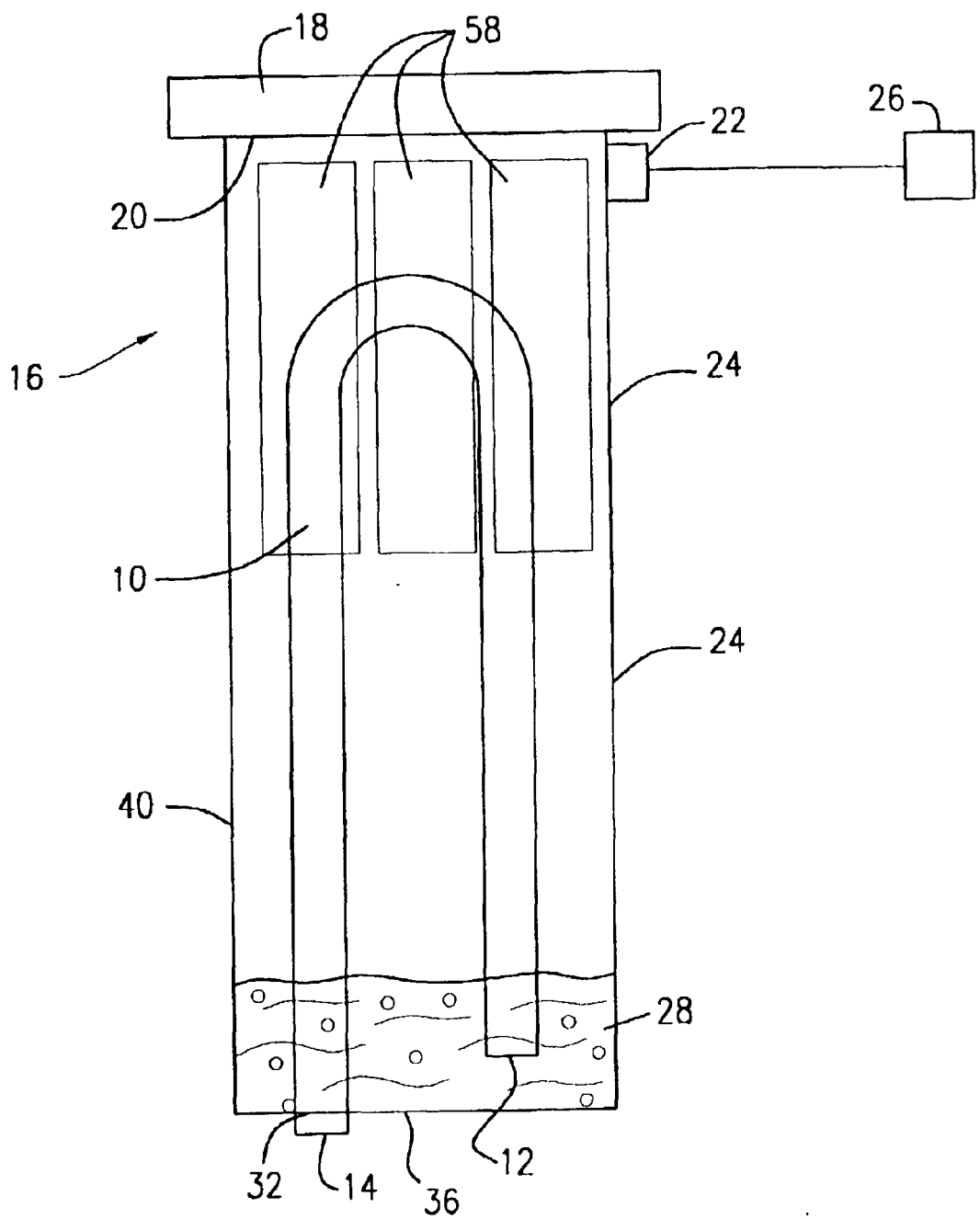

Whereas the arrangements of FIGS. 1–3 all show the open pipe end 14 as coupling through an outlet 30 in a side surface 40 of the casing 16, the pipe end 14 may couple instead to an outlet 32 in a bottom surface 36 of the casing, as illustrated in FIG. 4. There, only one row of three horizontally spaced filter pads 58 are shown, although other combinations of pads, in one or more rows, in similar or different numbers, and in similar or different dimensionings, may be employed instead. In like manner, although the embodiments of FIGS. 1–4 show the vertical axis of the casing 16 of a height dimension 100 greater than an included horizontal axis of length dimension 102, this selection can be reversed, so that the casing 16 is wider, rather than taller. As will be appreciated by those skilled in the art, the bilge water filter apparatus of FIGS. 1–4 is particularly suited for external mounting to the boat.

Whereas the externally mounted bilge water filter of the Ser. No. 09/680,181, now U.S. Pat. No. 6,652,750. Application also includes a filter pad which absorbs oil-based contaminants in bilge water, such construction operates by absorbing oil-based contaminants as the bilge water flows downwardly through the filter pad from its top opening inlet towards its bottom discharge outlet—namely, a 1-pass removal. With the construction of the present invention, however, the oil-based contaminants continue to circulate round and round into the filter pads by the activation of the bilge pump and as the water level rises and falls, until the contaminants are absorbed from the water upon which they float. This will be seen to follow from the inclusion of the coarse overlying gravel and/or charcoal layer 28 which restricts the flow of the oil-based contaminants to the open pipe end 12 and to the outlets 30, or 32. The end result is a more complete and efficient filtering, over a longer dwell time of the bilge water within the casing; and, in a construction which allows for the removal and discarding of the filter pads when filled, instead of a discarding of the filter itself in its entirety, as envisioned by the construction of that prior disclosure. This allows for a more inexpensive manner of filtering, as well as one affording a greater degree of environmental safety and securement.

While there have been described what are considered to be preferred embodiments of the present invention, it will be readily appreciated by those skilled in the art that modifications can be made without departing from the scope of the teachings herewith. For at least such reason, therefore, resort should be had to the claims appended hereto for a true understanding of the invention.

I claim:

1. A stationary bilge water filter apparatus comprising:
    a generally U-configured pipe having first and second open ends;
    a vertical casing aligning said pipe in vertical orientation therein;
    an inlet in said casing;
    a layer of material overlying said first open pipe end restrictive to the flow of oil-based contaminants;
    an outlet in said casing coupled with said second open pipe end;
    a plurality of filter pads atop said overlying layer adapted to absorb oil-based contaminants; and
    a bilge pump in flow communication with a bilge water discharge outlet for inputting oil-based contaminant bilge water into said inlet.

2. The stationary bilge water filter apparatus of claim 1 wherein said overlying layer includes a coarse material allowing substantially contaminant-free bilge water to flow therethrough.

3. The stationary bilge water filter apparatus of claim 2 wherein said overlying layer includes at least one of a gravel and charcoal coarse material.

4. The stationary bilge water filter apparatus of claim 1 wherein said overlying layer additionally overlies said second open pipe end.

5. The stationary bilge water filter apparatus of claim 4 wherein said second open pipe end extends downwardly below said overlying layer through said outlet.

6. The stationary bilge water filter apparatus of claim 4 wherein said second open pipe end extends sideways across said overlying layer through said outlet.

7. The stationary bilge water filter apparatus of claim 1 wherein individual ones of said plurality of filter pads are floatable.

8. The stationary bilge water filter apparatus of claim 7 wherein said individual ones of said plurality of filter pads are vertically aligned in columns horizontally spaced one from another.

9. The stationary bilge water filter apparatus of claim 7 wherein said plurality of filter pads are vertically aligned in columns horizontally spaced one from another in one or more rows.

10. The stationary bilge water filter apparatus of claim 1 wherein said casing includes a vertical axis of height dimension greater than an included horizontal axis of length dimension.

11. The stationary bilge water filter apparatus of claim 1 wherein said inlet is included within a side surface of said casing.

12. The stationary bilge water filter apparatus of claim 11 wherein said outlet is covered by said overlying layer.

13. The stationary bilge water filter apparatus of claim 1 wherein said inlet is adapted for coupling with a bilge water discharge outlet of a boat.

14. The stationary bilge water filter apparatus of claim 13 wherein a top surface of said casing includes a removable lid.

15. A stationary bilge water filter apparatus comprising:
    a generally U-configured pipe having first and second open ends;
    a vertically aligned casing orienting said pipe in vertical position therein;
    an inlet in said casing;
    a layer of material overlying said first open pipe end restrictive to the flow of oil-based contaminants;
    an outlet in said casing coupled with said second open pipe end and covered by said overlying layer;
    a plurality of filter pads horizontally spaced one from another in columns atop said overlying layer to absorb oil-based contaminants;
    and a bilge pump in flow communication with a bilge water discharge outlet for inputting oil-based contaminant water from a bilge water outlet into said inlet.

16. The stationary bilge water filter apparatus of claim 15 wherein said plurality of filter pads are vertically aligned in columns horizontally spaced one from another in one or more rows.

* * * * *